United States Patent
Taniguchi et al.

(10) Patent No.: US 9,203,760 B2
(45) Date of Patent: Dec. 1, 2015

(54) COMMUNICATION DEVICE AND ROUTE SEARCH METHOD

(71) Applicant: FUJITSU LIMITED, Kawasaki-shi, Kanagawa (JP)

(72) Inventors: Yuichiro Taniguchi, Fukuoka (JP); Tetsu Yamamoto, Fukuoka (JP); Kazuya Kawashima, Fukuoka (JP); Tsuyoshi Matsumoto, Fukuoka (JP); Tadashige Iwao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 258 days.

(21) Appl. No.: 14/037,678

(22) Filed: Sep. 26, 2013

(65) Prior Publication Data

US 2014/0029469 A1    Jan. 30, 2014

Related U.S. Application Data

(63) Continuation of application No. PCT/JP2012/058755, filed on Mar. 30, 2012.

(30) Foreign Application Priority Data

Mar. 30, 2011  (WO) ............................ JP2011/058138

(51) Int. Cl.
  *H04L 12/28* (2006.01)
  *H04L 12/801* (2013.01)
  *H04L 12/721* (2013.01)

(52) U.S. Cl.
  CPC ............... *H04L 47/12* (2013.01); *H04L 45/26* (2013.01)

(58) Field of Classification Search
  CPC ................................. H04L 47/12; H04L 45/26
  USPC ........................................................ 370/254
  See application file for complete search history.

(56) References Cited

U.S. PATENT DOCUMENTS 8,301,323 B2 * 10/2012 Niwa .............................. 701/22
2007/0195713 A1 8/2007 Khan et al.

(Continued)

FOREIGN PATENT DOCUMENTS

JP    2003-061120    2/2003
JP    2007-228083    9/2007

(Continued)

OTHER PUBLICATIONS

English language copy of International Search Report for PCT/JP2012/058755, mailed Apr. 24, 2012, 1 page.

*Primary Examiner* — Shripal Khajuria
*Assistant Examiner* — Faisal Choudhury
(74) *Attorney, Agent, or Firm* — Staas & Halsey LLP

(57) ABSTRACT

A node transmits a route search demand, which is a demand to search for a route from the node to a predetermined device among adjacent communication devices, to an adjacent communication device that is not selected as a transmission destination of the route search demand. The node transmits the route search demand when the number of adjacent communication devices serving as confirmed routes is smaller than a predetermined number and when there is an adjacent communication device that has not been selected. The node stops transmission of the route search demand when the number of the adjacent communication devices serving as the confirmed routes reaches the predetermined number. The node transmits a warning to the predetermined device when the number of the adjacent communication devices serving as the confirmed routes is smaller than the predetermined number and when there is no adjacent communication device that has not been selected.

6 Claims, 12 Drawing Sheets

(56) References Cited

U.S. PATENT DOCUMENTS

2008/0186984 A1     8/2008   Nakano
2010/0303045 A1*   12/2010   Venkob et al. ................ 370/336
2015/0003457 A1*    1/2015   Sugiyama et al. ............ 370/392

FOREIGN PATENT DOCUMENTS

| | | |
|---|---|---|
| JP | 2008-193543 | 8/2008 |
| JP | 2010-098591 | 4/2010 |
| WO | WO 2005/117365 | 12/2005 |

\* cited by examiner

FIG.3

| ADJACENT NODE | ADDRESS INFORMATION |
|---|---|
| NODE B | MAC(B) |
| NODE E | MAC(E) |

FIG.4

| ADJACENT NODE | ADDRESS INFORMATION |
|---|---|
| NODE B | MAC(B) |
| NODE C | MAC(C) |
| NODE E | MAC(E) |
| NODE G | MAC(G) |
| NODE H | MAC(H) |

FIG.5

| GD ADDRESS INFORMATION | LD ADDRESS INFORMATION | PRIORITY |
|---|---|---|
| MAC(GW) | MAC(B) | 1 |
| | MAC(C) | 2 |
| | MAC(G) | 3 |

FIG.6

| FRAME ID | GS | COUNT ID | CANDIDATE DESTINATION | CANDIDATE DESTINATION TRANSMISSION COMPLETE FLAG | ADJACENT NODE | ADJACENT NODE TRANSMISSION COMPLETE FLAG | LS |
|---|---|---|---|---|---|---|---|
| F1 | MAC(E) | 1 | MAC(B) | ON | MAC(B) | ON | MAC(E) |
| | | | MAC(C) | OFF | MAC(C) | OFF | |
| | | | MAC(G) | OFF | MAC(E) | OFF | |
| | | | | | MAC(G) | OFF | |
| | | | | | MAC(H) | OFF | |

FIG.7

| GS | GD | LS | LD | REJECTED NODE LIST | COUNT ID | FRAME ID | TRANS-MISSION TIME |

FIG.8

| GS | GD | LS | LD | WARNING NODE |

| CONTENT OF CAUSE | INFORMATION ON A CAUSAL NODE | GS | LS | FRAME ID |

COMMUNICATION DEVICE AND ROUTE SEARCH METHOD

CROSS-REFERENCE TO RELATED APPLICATIONS

This application is based upon and claims the benefit of priority of the prior International Application No. PCT/JP2011/058138, filed on Mar. 30, 2011, the entire contents of which are incorporated herein by reference. And this application is a continuation of International Application No. PCT/JP2012/058755, filed on Mar. 30, 2012 and designating the U.S., the entire contents of which are incorporated herein by reference.

FIELD

The embodiments discussed herein are directed to a communication device and a route search method.

BACKGROUND

In recent years, an autonomous distributed network, such as an ad hoc network, has been used, in which a network is established by directly connecting terminals to one another without using network infrastructures, such as base stations or access points.

The autonomous distributed network connects a large number of terminals without using access points, based on a technology applied to wireless connections between computers, personal digital assistants (PDAs), mobile telephone terminals, and the like. The autonomous distributed network autonomously establishes a network due to addition or deletion of nodes. Therefore, the autonomous distributed network can reduce load for setting a network and is useful when a large number of nodes are provided or when a network configuration is changed with some frequency.

As a technology for managing the network status of the autonomous distributed network as described above, there is a known method to cause a management server to centrally manage the network status or cause an individual node to autonomously manage the network status by collecting neighborhood topologies.

Patent Literature 1: International Publication Pamphlet No. WO 2005/117365
Patent Literature 2: Japanese Laid-open Patent Publication No. 2003-061120

However, in the conventional technology, the management server or each of the nodes transmits a packet to other nodes every time the management server or each of the nodes detects an event, such as initial start-up of a node, addition of a node, or a network disconnection. Therefore, there is a problem in that a traffic increases and load on the nodes increases.

For example, when detecting an event, the management server or each of the nodes transmits a packet to all of the nodes in a network and receives responses. Subsequently, the management server or each of the nodes generates a topology based on the received responses. Thereafter, the management server or each of the nodes compares a topology that is generated by detection of a previous event with the topology that is generated at this time to detect a change in the network configuration.

In this way, the management server or each of the nodes performs a large number of processes to specify a change in the network configuration. Therefore, in the large-scale network including an enormous number of nodes, the processing load increases enormously. Furthermore, in the large-scale network, an enormous number of nodes transmit packets, so that the traffic volume increases enormously. Moreover, if nodes are added or deleted frequently, there is a problem in that the processing load becomes a bottleneck and it becomes impossible to follow a change in the network configuration.

SUMMARY

According to an aspect of the embodiment, a communication device includes a memory and a processor connected to the memory. The processor executes a process including first transmitting a route search demand, the route search demand being a demand to search for a route from the communication device to a predetermined device among adjacent communication devices that communicate directly with the communication device, to an adjacent communication device that is not selected as a transmission destination of the route search demand; receiving a response to the route search demand transmitted at the first transmitting from the predetermined device; second transmitting the route search demand when the response is received, and when the number of adjacent communication devices serving as confirmed routes is smaller than a predetermined number and when there is an adjacent communication device that has not been selected; stopping transmission of the route search demand when the response is received and when the number of the adjacent communication devices serving as the confirmed routes reaches the predetermined number; and third transmitting a warning to the predetermined device when the number of the adjacent communication devices serving as the confirmed routes is smaller than the predetermined number and when there is no communication device that has not been selected.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of information stored in a redundant route table;
FIG. 4 is a diagram illustrating an example of information stored in a link table;
FIG. 5 is a diagram illustrating an example of information stored in a routing table;
FIG. 6 is a diagram illustrating an example of information stored in a transfer record table;
FIG. 7 is a diagram illustrating an example of a frame format of a route search demand;
FIG. 8 is a diagram illustrating a frame format of a warning.

DESCRIPTION OF EMBODIMENTS

Preferred embodiments of the present invention will be explained with reference to accompanying drawings.

The present invention is not limited to the embodiments below.

[a] First Embodiment

In a first embodiment, an explanation will be given of an overall configuration of a system including node devices (hereinafter, referred to as "nodes") according to the first embodiment, a functional block diagram of the nodes, processing flow, and advantageous effects. The nodes explained below are devices, such as communication devices, that constitute an ad hoc network. Examples of the nodes include an information processing apparatus such as a server, a relay device such as a router, and a wireless device including a sensor or the like.

Overall Configuration

Figure 1:
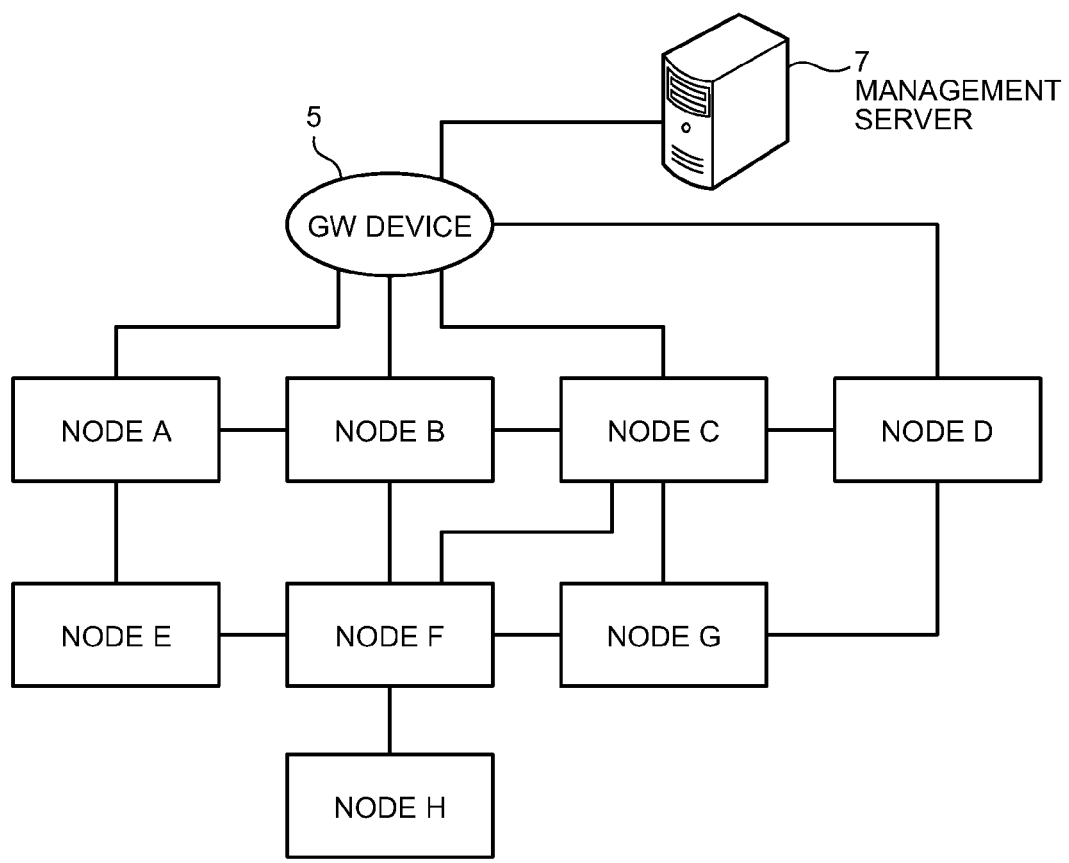
FIG. 1 is a diagram illustrating an overall configuration of a system according to a first embodiment.

FIG. 1 is a diagram illustrating the overall configuration of the system according to the first embodiment. As illustrated in FIG. 1, the system includes a gateway (GW) device 5, a management server 7, a node A, a node B, a node C, a node D, a node E, a node F, a node G, and a node H. The system illustrated in FIG. 1 is an autonomous distributed network, such as an ad hoc network, in which the nodes are connected to one another based on a technology used for wireless connections, without using access points. The nodes illustrated in FIG. 1 are one example of the communication devices.

The GW device 5 is a data relay device that relays data between the system illustrated in FIG. 1 and other systems or relays data between each of the nodes illustrated in FIG. 1 and the management server 7. The GW device 5 transfers various types of information transmitted by each of the nodes to the management server 7. The management server 7 is a computer apparatus used by administrators who manage the system and all of the nodes illustrated in FIG. 1. The management server 7 receives information transmitted by each of the nodes via the GW device 5.

Each of the nodes is a computer apparatus that forms an ad hoc network, and is a device, such as a personal digital assistant (PDA) or a mobile telephone terminal, that enables wireless connections. Each of the nodes can specify a communicable node, that is, an adjacent node, or specify a route to the GW device 5 by exchanging a Hello packet with the other nodes.

Each of the nodes as described above transmits a route search demand to an adjacent node that is not selected as a transmission destination of the route search demand, where the route search demand is a demand to search for a route from a subject node to the GW device 5 among adjacent nodes serving as communication devices that can directly communicate with the subject node. Actually, a transmitting of the route search demand substantially means an execution of a redundant route search. A node that receives the route search demand transmits the route search demand to a next node in a direction toward the destination. The route search demand is a frame for a process to actually confirm the redundant route. When each of the nodes receives a response, and if the number of adjacent nodes serving as confirmed routes is smaller than a predetermined number and if there is an adjacent communication device that has not been selected, each of the nodes transmits the route search demand.

When each of the nodes receives a response, and if the number of adjacent nodes serving as the confirmed routes reaches the predetermined number, each of the nodes stops transmission of the route search demand. If the number of adjacent nodes serving as the confirmed routes is smaller than the predetermined number and if there is no communicable adjacent communication device to which the route search demand has not been transmitted, each of the nodes transmits a warning to the GW device 5.

As described above, each of the nodes suspends a route search when a predetermined number of redundant routes is ensured, and transmits a warning to the GW device 5 when the predetermined number of redundant routes is not ensured. Therefore, it is possible to confirm a network configuration while reducing the traffic to search for redundant routes, compared with the conventional technology in which a management server centrally manages the network status or each of the nodes generates a topology.

Configuration of the Node

Figure 2:
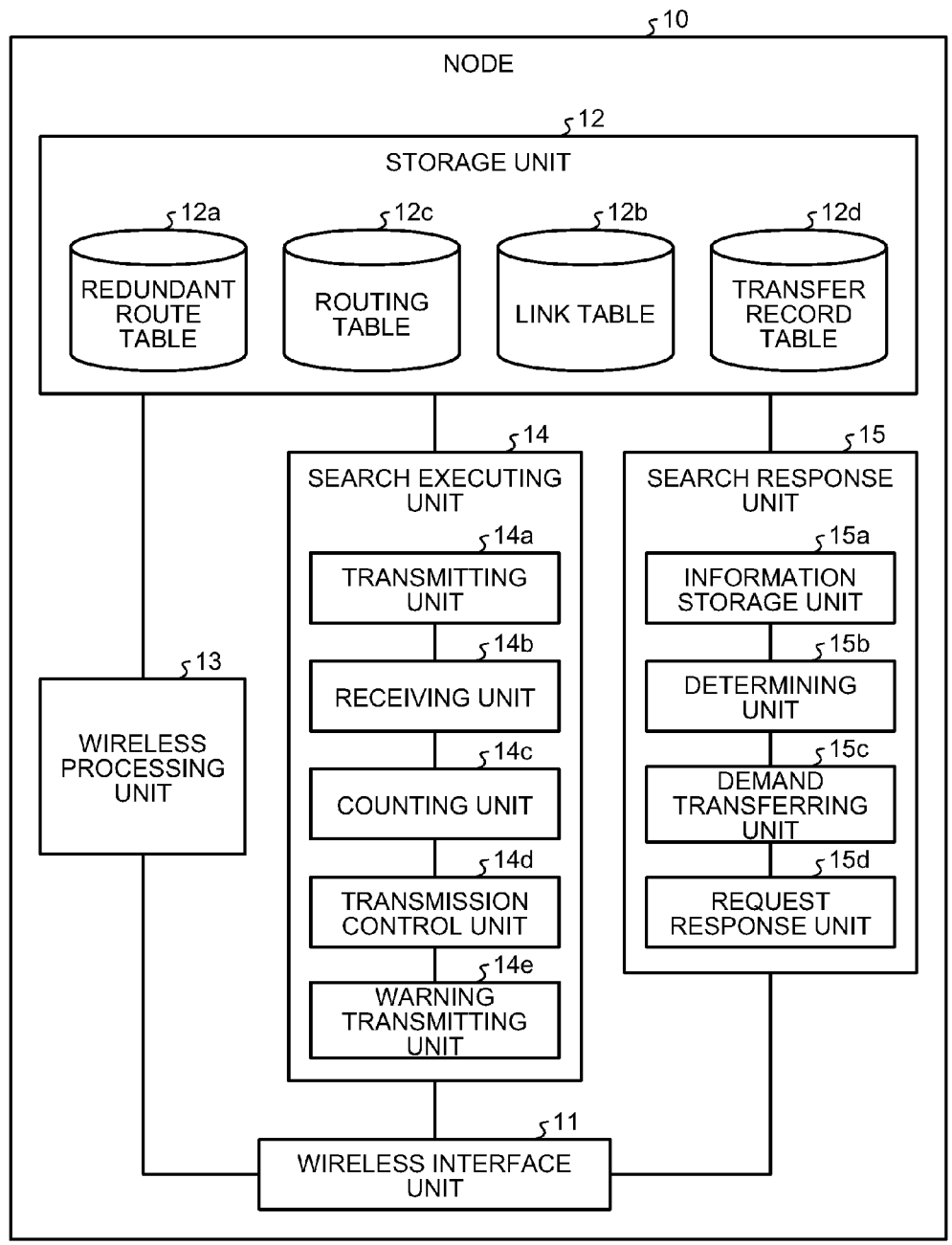
FIG. 2 is a functional block diagram illustrating a configuration of a node.

FIG. 2 is a functional block diagram illustrating a configuration of a node. All of the nodes illustrated in FIG. 1 have the same configuration; therefore, a node 10 will be explained below. The GW device 5 has the same configuration as that of a general gateway unit and the management server 7 has the same configuration as that of a general server device; therefore, detailed explanation thereof will be omitted.

The node 10 includes a wireless interface unit 11, a storage unit 12, a wireless processing unit 13, a search executing unit 14, and a search response unit 15. Each of the control units described below is illustrated by way of example only, and the present invention is not limited to this example. For example, it may be possible to include a display unit, such as a display, or an input unit, such as a keypad.

The storage unit 12 is a storage device, such as a semiconductor memory element or a hard disk. Each of the wireless processing unit 13, the search executing unit 14, and the search response unit 15 is an electronic circuit, such as a central processing unit (CPU), or an integrated circuit, such as a field-programmable gate array (FPGA).

The wireless interface unit 11 includes at least one antenna, transmits and receives radio waves via the antenna, and establishes a wireless connection to each of the nodes. For example, the wireless interface unit 11 transmits a route search demand to an adjacent node and receives a response to the route search demand from the GW device 5. In addition, the wireless interface unit 11 transmits a warning to the GW device 5.

The storage unit 12 stores therein various types of information used for a wireless communication, and includes a redundant route table 12a, a link table 12b, a routing table 12c, and a transfer record table 12d. The storage unit 12 stores, as a service level agreement (SLA), "2" indicating "the number of redundant routes designated by a user".

The redundant route table 12a stores therein redundant routes serving as the confirmed routes. The information herein is stored by the search executing unit 14 or the like. In this example, two redundant routes ("2") as the SLA is stored as a maximum value.

FIG. 3 is a diagram illustrating an example of information stored in the redundant route table. As illustrated in FIG. 3, the redundant route table 12*a* stores therein "an adjacent node and address information". The "adjacent node" stored herein indicates a node which can perform a wireless communication and to which the node 10 first connects as a route to the GW device 5. The "address information" is address information, such as a media access control (MAC) address, on the adjacent node. In the example in FIG. 3, it is indicated that "the node B" with the MAC address MAC(B) and "the node E" with the MAC address MAC(E) are stored as the redundant routes of the node 10.

The link table 12*b* stores therein information on a node that can perform a wireless communication with the node 10. The information herein is stored based on a Hello packet that the wireless processing unit 13 or the like has exchanged with other nodes, as will be explained later, or stored by an administrator or the like.

FIG. 4 is a diagram illustrating an example of information stored in the link table. As illustrated in FIG. 4, the link table 12*b* stores therein "an adjacent node and address information". The "adjacent node" stored herein indicates a node that can perform a wireless communication with the node 10, and the "address information" indicates address information, such as a MAC address, on the adjacent node. In the example in FIG. 4, "the node B, the node C, the node E, the node G, and the node H" are stored as the adjacent nodes, and it is indicated that the respective MAC addresses are "MAC(B), MAC(C), MAC(E), MAC(G), and MAC(H)".

The routing table 12*c* stores therein high-priority routes among routes from the node 10 to the GW device 5, that is, routes with high speech quality. The information herein is stored based on a Hello packet that the wireless processing unit 13 or the like has exchanged with other nodes, as will be explained later, or stored by an administrator or the like.

FIG. 5 is a diagram illustrating an example of information stored in the routing table. As illustrated in FIG. 5, the routing table 12*c* stores therein "global destination (GD) address information, local destination (LD) address information, and a priority". The "GD address information" stored herein indicates address information on a node serving as a final destination, and in this example, the MAC address of the GW device 5 is stored. The "LD address information" is address information on a node that serves as a destination next to the node 10 with respect to the GD, that is, the MAC address of an adjacent node of the node 10 when the GW device 5 serves as a destination. The "priority" is information indicating the descending order of the speech quality. For example, 1 indicates the highest priority and 3 indicates the third priority.

In the example in FIG. 5, it is indicated that, in a route to the MAC(GW) serving as a destination, a route from the node 10 to the MAC(B) has the highest priority, a route from the node 10 to the MAC(C) has the second priority, and a route from the node 10 to the MAC(G) has the third priority.

The transfer record table 12*d* is a temporary storage area for storing information at the time of the search for redundant routes for each redundant route search demand. The information herein is stored by the search executing unit 14 or the search response unit 15 to be described later or by an administrator. FIG. 6 is a diagram illustrating an example of information stored in the transfer record table. As illustrated in FIG. 6, the transfer record table 12*d* stores "a frame ID, a global source (GS), a count ID, a candidate destination, a candidate destination transmission complete flag, an adjacent node, an adjacent node transmission complete flag, and a local source (LS)". The transfer record table 12*d* stores the above information for each route search demand, that is, for each frame ID to be described later.

The "frame ID" is an identifier for identifying a route search demand. The "GS" is a MAC address of a node serving as a transmission source that has transmit the route search demand. The "count ID" is information indicating the number of searches for a redundant route by the route search demand. The "candidate destination" is a MAC address of an adjacent node acquired from the routing table 12*c* of the node 10. The "candidate destination transmission complete flag" is information indicating whether the route search demand is already transmitted to each of candidate destinations. The "adjacent node" is a MAC address of an adjacent node acquired from the link table 12*b* of the node 10. The "adjacent node transmission complete flag" is information indicating whether the route search demand has been transmitted to each of adjacent nodes. The "LS" indicates a transfer destination of the redundant route search demand.

In the example in FIG. 6, it is indicated that a route search demand to search for "the first" redundant route is received from the node E corresponding to the "MAC(E)" and the "frame ID" of "F1". It is also indicated that higher-priority candidate nodes are devices corresponding to the "MAC(B), MAC(C), and MAC(G)" and the route search demand has already been transmitted to the device corresponding to the MAC(B). It is also indicated that adjacent nodes of the node 10 are devices corresponding to the "MAC(B), MAC(C), MAC(E), MAC(G), and MAC(H)" and the route search demand has already been transmitted to the device corresponding to the MAC(B).

Referring back to FIG. 2, the wireless processing unit 13 is a processing unit that performs a wireless communication related to a general ad hoc network. For example, the wireless processing unit 13 establishes a wireless communication between the node 10 and the other nodes. The wireless processing unit 13 also transmits and receives a Hello packet to and from the other nodes and specifies a route to the GW device 5. The wireless processing unit 13 generates data of the redundant route table 12*a*. Similarly, the wireless processing unit 13 transmits and receives a Hello packet to and from the other nodes, specifies an adjacent node or the like, and generates data of the link table 12*b* or the routing table 12*c*.

The search executing unit 14 is a processing unit that includes a transmitting unit 14*a*, a receiving unit 14*b*, a counting unit 14*c*, a transmission control unit 14*d*, and a warning transmitting unit 14*e*, and performs a route search according to a predetermined trigger, such as activation of the node 10.

The transmitting unit 14*a* transmits a route search demand, which is a demand to search for a route from the node 10 to the GW device 5, to a node to which the route search demand has not been transmitted from among nodes that can directly perform a wireless communication.

Specifically, with reference to the example described above, at the time of initial operation of the node 10, the transmitting unit 14*a* acquires the MAC(B) that is the address information of the adjacent node (B) to which the highest priority is given, by referring to the routing table 12*c*. The transmitting unit 14*a* transmits the route search demand to the MAC(B). An example of the route search demand to be transmitted will be explained below. FIG. 7 is a diagram illustrating an example of a frame format of the route search demand.

As illustrated in FIG. 7, the route search demand contains "a GS, a GD, a LS, a LD, a rejected node list, a count ID, a frame ID, and a transmission time". The "GS" is address information on a node serving as a transmission source, and in this example, is the MAC address of the node 10. The "GD" is address information on a final destination of the route search demand, and in this example, is the address information "MAC(GW)" of the GW device.

The "LS" is address information on a node to which the route search demand is transferred, and in this example, is the MAC address of the node 10. For example, when the node E transfers the route search demand to the node A, the "LS" is the MAC address of the node E. The "LD" is address information on a node serving as a transmission destination of the route search demand. In this example, the LS is the MAC(E) and the LD is the MAC(A). The "rejected node list" is address information on a node that is not designated as a transfer destination of the route search demand, and corresponds to the address information on a node indicated in the link table of the "GS". In this example, the "rejected node list" is the MAC (A) and the MAC(F).

The "count ID" is information indicating the number of searches for a redundant route by the route search demand, and is set to "1" at the time of initial operation. The "frame ID" is an identifier for identifying the route search demand, and is uniquely assigned by the transmitting unit 14a. The "transmission time" is a transmission time of the route search demand.

For example, assuming that the node 10 at the initial operation transmits a route search demand to search for a route to the GW device 5 to the node B at a time 10:00:00, the transmitting unit 14a generates a route search demand containing "GS=MAC(the node 10), GD=MAC(GW), LS=MAC(the node 10), LD=MAC(the node B), rejected node list=none, frame ID=F1, and transmission time=10:00:00". The transmitting unit 14a transmits the generated route search demand to the node B. The transmitting unit 14a associates a selection complete flag, which indicates that the node B is already selected as a transmission destination of the route search demand, and information stored in, for example, the link table 12b or the routing table 12c for management.

After transmitting the route search demand to the node B, if the transmitting unit 14a receives a demand transmission instruction from the transmission control unit 14d to be described later, the transmitting unit 14a acquires the MAC (C) that is the address information on the adjacent node (C) to which the second highest priority is given, by referring to the routing table 12c. Subsequently, the transmitting unit 14a generates a route search demand and transmits the route search demand to the node C. At this time, the route search demand contains "GS=MAC(the node 10), GD=MAC(GW), LS=MAC(the node 10), LD=MAC(the node C), rejected node list=MAC(the node B), frame ID=F2, and transmission time=10:05:00".

The transmitting unit 14a repeats transmission of the route search demand until, for example, the SLA indicating that the number of redundant routes=2 is satisfied and until an adjacent node is detected, according to an instruction of the transmission control unit 14d. The order in which the transmitting unit 14a specifies an adjacent node is firstly based on the order of priorities stored in the routing table 12c, and secondly based on the order of adjacent nodes stored only in the link table 12b.

Referring back to FIG. 2, the receiving unit 14b is a processing unit that receives, from the GW device 5, a response to the route search demand transmitted by the transmitting unit 14a. When receiving an ACK response as a response to the transmitted route search demand from the GW device 5, the receiving unit 14b notifies the counting unit 14c of the reception of the ACK response. As an example of the way to associate the route search demand and the ACK response, various methods may be applied, such as a method to include frame IDs in both of the route search demand and the ACK response.

The counting unit 14c is a processing unit that counts redundant routes serving as the confirmed routes. For example, when the transmitting unit 14a starts transmission of the route search demand, the counting unit 14c deletes information from the redundant route table 12a for initialization. Subsequently, when the counting unit 14c is notified that the ACK response is received by the receiving unit 14b, the counting unit 14c acquires, from the ACK response or the transmitting unit 14a, address information on a node selected as the adjacent node and stores the address information in the redundant route table 12a. In this way, because the counting unit 14c first performs initialization and then stores the redundant routes serving as the confirmed routes, the transmitting unit 14a can confirm the number of searches for a redundant route at a transmission timing of the route search demand.

The transmission control unit 14d is a processing unit that repeatedly issues the redundant route search demand until the SLA is satisfied. Specifically, when the number of times that the receiving unit 14b has received a response becomes equal to the number defined in the SLA, the transmission control unit 14d causes the transmitting unit 14a to stop transmission of the route search demand. When the number of times that the receiving unit 14b has received a response is smaller than the number defined in the SLA and when there is a communicable node to which the route search demand has not been transmitted, the transmission control unit 14d causes the transmitting unit 14a to transmit the route search demand.

For example, when the receiving unit 14b receives a response, the transmission control unit 14d determines whether the number of redundant routes obtained by the search satisfies the SLA by referring to the redundant route table 12a. If the number of the redundant routes stored in the redundant route table 12a satisfies the SLA, the transmission control unit 14d outputs an instruction to the transmitting unit 14a to stop transmission. Consequently, the transmitting unit 14a stops transmission of the route search demand.

On the other hand, if the number of the redundant routes stored in the redundant route table 12a does not satisfy the SLA, the transmission control unit 14d refers to the routing table 12c or the link table 12b. The transmission control unit 14d specifies a node that has not been selected as the transmission destination of the route search demand. For example, the transmission control unit 14d specifies a node based on the selection complete flag or the like that the transmitting unit 14a has stored in the routing table 12c or the link table 12b. Subsequently, the transmission control unit 14d transmits an instruction to the transmitting unit 14a to continue to transmit the route search demand. At this time, the transmission control unit 14d may transmit address information on a node that has not been selected to the transmitting unit 14a.

The warning transmitting unit 14e is a processing unit that transmits a warning to the GW device 5 when redundant routes that satisfy the SLA have not been obtained by the search. Specifically, when the number of times that the receiving unit 14b has received a response is smaller than the number defined in the SLA and when there is no communicable communication device to which the route search demand has not been transmitted, the warning transmitting unit 14e transmits a warning to the GW device 5.

For example, when the receiving unit 14b receives a response, the warning transmitting unit 14e determines whether the number of redundant routes obtained by the search satisfies the SLA by referring to the redundant route table 12a. If the number of the redundant routes stored in the redundant route table 12a does not satisfy the SLA, the warning transmitting unit 14e refers to the routing table 12c or the link table 12b. Furthermore, if there is no node that has not been selected as the transmission destination of the route search demand, the warning transmitting unit 14e determines that the node 10 is a device that does not satisfy the SLA, and transmits a warning to the GW device 5.

The warning transmitted by the warning transmitting unit 14e will be explained below. FIG. 8 is a diagram illustrating a frame format of the warning. As illustrated in FIG. 8, the warning contains "a GS, a GD, a LS, a LD, and a warning node". The "GS" is address information on a node serving as a transmission source, and in this example, is the MAC address of the node 10. The "GD" is address information on a final destination of the route search demand, and in this example, the address information "MAC(GW)" of the GW device. The "LS" is address information on a node to which the route search demand is transferred. The "LD" is address information on a node serving as a transmission destination of the route search demand. The "warning node" is address information on a node that is a trigger of a warning. However, this item is blank when a warning is issued due to the instability at the time of activation of a network.

Referring back to FIG. 2, the search response unit 15 includes an information storage unit 15a, a determining unit 15b, a demand transferring unit 15c, and a request response unit 15d, and performs processes in response to a route search demand received from the other nodes.

The information storage unit 15a is a processing unit that specifies a route search status and stores information in the transfer record table 12d when receiving the route search demand from the other nodes. For example, the information storage unit 15a extracts the "frame ID" from the received route search demand, and if the "frame ID" is not stored in the transfer record table 12d, generates a new record associated with the "frame ID" in the transfer record table 12d. Subsequently, the information storage unit 15a stores information specified in the processes described below, with respect to the new generated record.

Specifically, the information storage unit 15a extracts a "GS", a "count ID", and an "LS" from the received route search demand, and stores them in the transfer record table 12d. Subsequently, the information storage unit 15a acquires address information on a high-priority node from the routing table 12c, and stores the address information in the "candidate destination" in the transfer record table 12d. Alternatively, the information storage unit 15a stores address information other than the "LS" contained in the route search demand in the "candidate destination" in the transfer record table 12d. The information storage unit 15a acquires, from the link table 12b, address information on an adjacent node that can directly communicate with the node 10, and stores the address information in the "adjacent node" in the transfer record table 12d. Alternatively, the information storage unit 15a stores address information other than the "LS" contained in the route search demand in the "adjacent node" in the transfer record table 12d. In addition, the information storage unit 15a extracts address information on a node contained in the "rejected node list" from the received route search demand, and sets the "flag" of a corresponding "candidate destination" or "adjacent node" to "ON". Alternatively, when the "LS" is contained, the information storage unit 15a sets the "flag" of a "candidate destination" or "adjacent node" corresponding to the "LS" to "ON".

The determining unit 15b is a processing unit that determines whether there is a transfer destination by referring to the transfer record table 12d when the information storage unit 15a receives the route search demand. Specifically, the determining unit 15b searches for a route to the GW device 5 under a restriction condition that an adjacent node other than the selected node is used.

For example, the determining unit 15b extracts the "frame ID" from the received route search demand, and specifies a record that is associated with the extracted "frame ID" in the transfer record table 12d. The determining unit 15b specifies a "candidate destination" for which the "candidate destination transmission complete flag" is not set to "ON" from among the "candidate destinations" of the specified record, and notifies the demand transferring unit 15c of the specified transfer destination. On the other hand, when there is no "candidate destination" for which the "candidate destination transmission complete flag" is not set to "ON" among the "candidate destinations" of the specified record, the determining unit 15b refers to the "adjacent nodes" of the specified record. The determining unit 15b specifies a "adjacent node" for which the "adjacent node transmission complete flag" is not set to "ON" from among the "adjacent nodes" of the specified record, and notifies the demand transferring unit 15c of the specified node. When there is no "adjacent node" for which the "adjacent node transmission complete flag" is not set to "ON" among the "adjacent nodes" of the specified record, the determining unit 15b notifies the request response unit 15d of the result.

Namely, the determining unit 15b selects an adjacent node for which a redundant route has not been confirmed under a restriction condition that adjacent nodes other than the selected nodes are not used, and notifies the demand transferring unit 15c of a selected node. However, the determining unit 15b does not include a node other than the adjacent node or redundancy between node lines in the restriction condition.

The demand transferring unit 15c transfers the route search demand received by the information storage unit 15a to the node notified by the determining unit 15b. For example, when the demand transferring unit 15c is notified of the MAC(B) of the node B by the determining unit 15b, the demand transferring unit 15c changes the "LD" of the route search demand to the "MAC(B)" and changes the "LS" of the route search demand to the MAC address of the node 10, and transfers the route search demand. At this time, the demand transferring unit 15c sets the "adjacent node transmission complete flag" of the "MAC(B)" stored in the "LD" to "ON" in the transfer record table 12d.

When the request response unit 15d is notified that there is no adjacent node by the determining unit 15b, the request response unit 15d transmits the received route search demand by using the "LS" of the route search demand as a destination. Namely, when there is no transfer destination, the request response unit 15d transfers the demand to the transmission source based on Depth-First method.

Processing Flow

A process performed when the route search demand is transmitted and a process performed when the route search demand is received will be explained below.

Process Performed When the Route Search Demand is Transmitted

Figure 9:
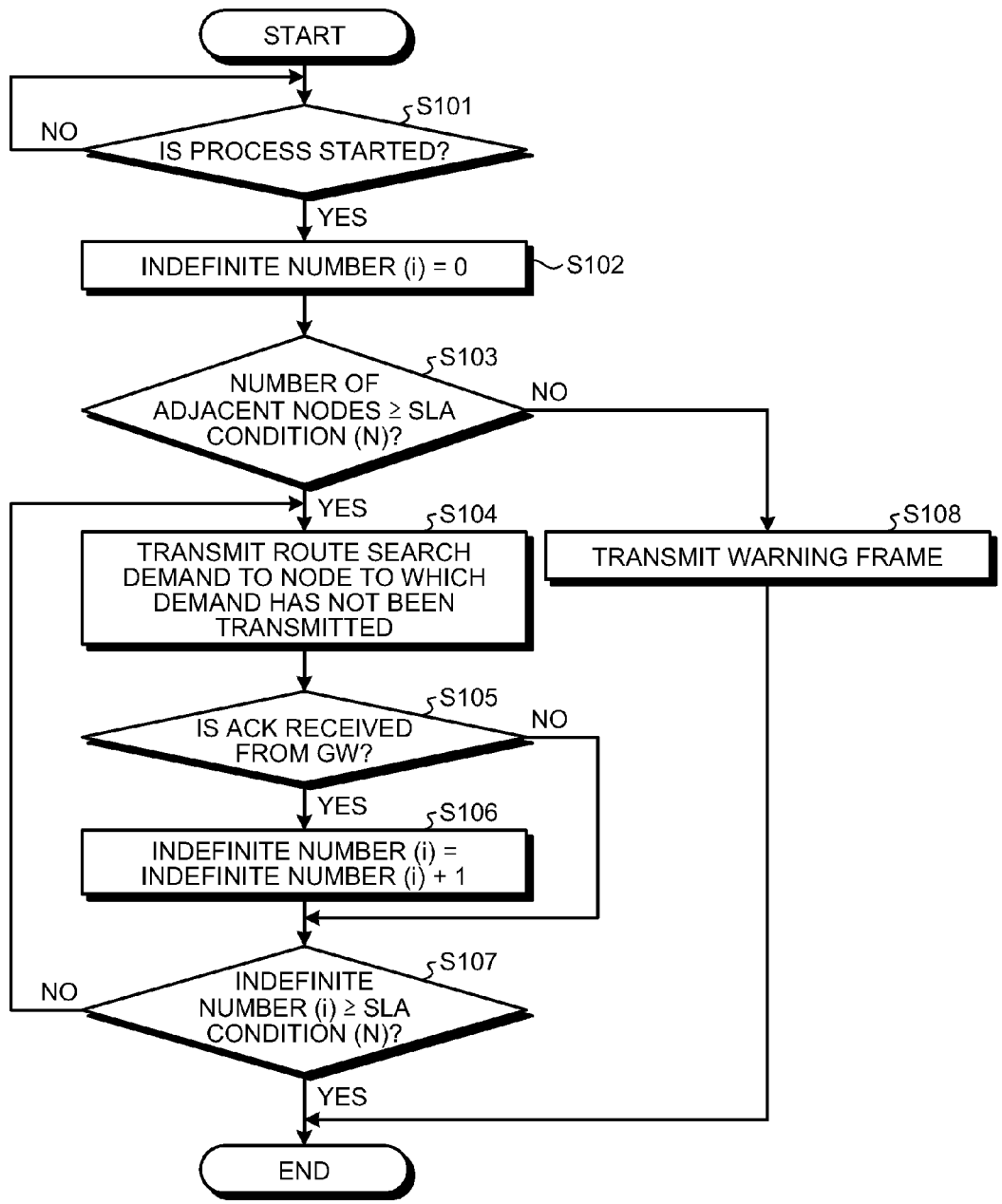
FIG. 9 is a flowchart illustrating the flow of a process when the node according to the first embodiment transmits a route search demand.

FIG. 9 is a flowchart illustrating the flow of a process when the node according to the first embodiment transmits a route search demand. As illustrated in FIG. 9, when the transmitting unit 14a is instructed to start a process (YES at S101), the transmitting unit 14a sets an indefinite number (i) to "0" (S102).

Subsequently, the transmitting unit 14a refers to the routing table 12c or the link table 12b to determine whether the number of adjacent nodes satisfies the SLA condition, that is, whether the number of adjacent nodes is equal to or greater than the number (N) defined in the SLA (S103).

When the number of adjacent nodes is equal to or greater than the number defined in the SLA (YES at S103), the transmitting unit 14a generates a route search demand and transmits the route search demand to a node to which the route search demand has not been transmitted (S104). Subsequently, when receiving an ACK from the GW device 5 (YES at S105), the counting unit 14c increments the indefinite number (i) (S106). When ACK is not received from the GW device 5 and timeout or the like occurs (NO at S105), the process at S107 is performed without performing the process at S106.

The transmission control unit 14d determines whether the indefinite number (i) satisfies the SLA condition, that is, whether the number of received ACKs is equal to or greater than the number (N) defined in the SLA (S107). When the transmission control unit 14d determines that the indefinite number (i) satisfies the SLA condition (N) (YES at S107), the process is terminated. On the other hand, when the transmission control unit 14d determines that the indefinite number (i) does not satisfy the SLA condition (NO at S107), the process is repeated from S104.

At S103, when the number of adjacent nodes is smaller than the number defined in the SLA (NO at S103), the warning transmitting unit 14e generates a warning frame and transmits the warning frame to the GW device 5 (S108).

Process Performed When the Route Search Demand is Received

Figure 10:
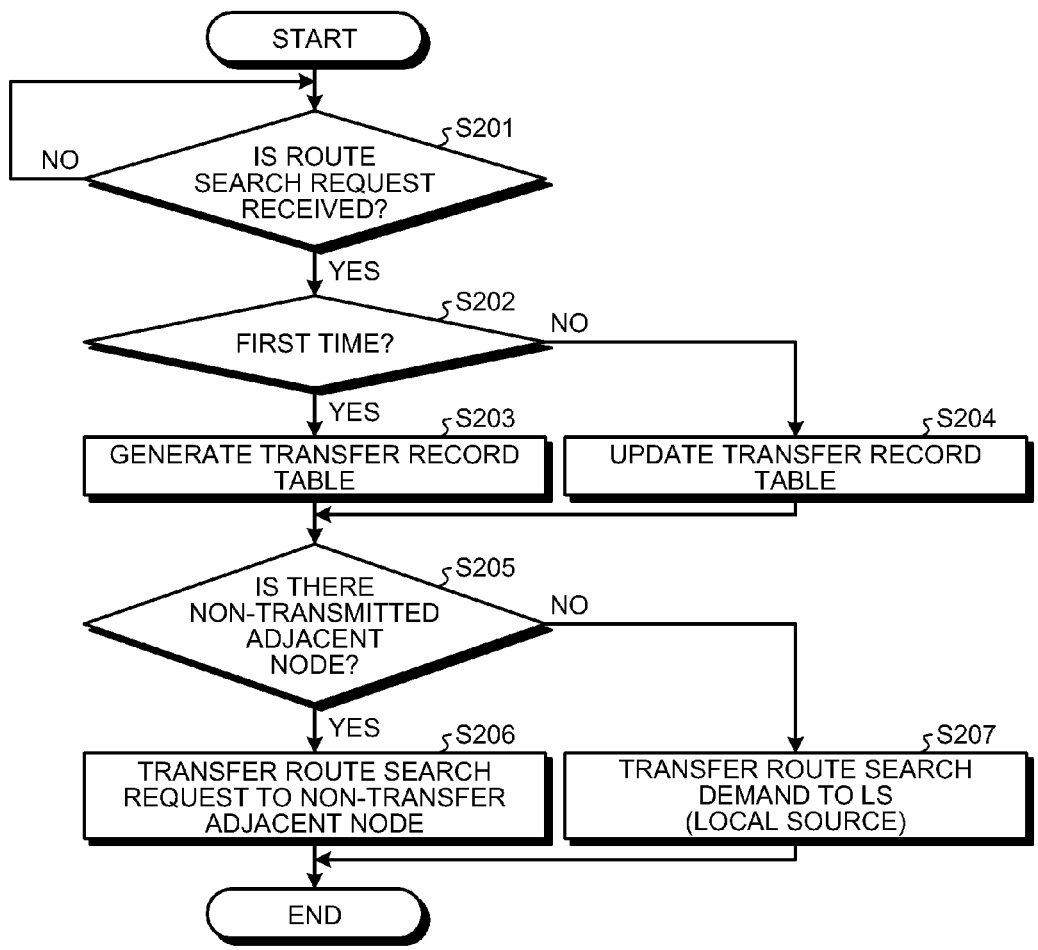
FIG. 10 is a flowchart illustrating the flow of a process when the node according to the first embodiment receives a route search demand.

FIG. 10 is a flowchart illustrating the flow of a process when the node according to the first embodiment receives a route search demand. As illustrated in FIG. 10, when receiving a route search demand from the other nodes (YES at S201), the information storage unit 15a refers to the transfer record table 12d by using the "frame ID" in the route search demand and determines whether the route search demand is the first route search demand (S202).

When the received route search demand is the first route search demand (YES at S202), the information storage unit 15a generates the transfer record table 12d corresponding to the frame ID (S203). On the other hand, when the received route search demand is not the first route search demand (NO at S202), the information storage unit 15a updates the transfer record table 12d corresponding to the frame ID (S204).

Subsequently, when the determining unit 15b determines that there is an adjacent node to which the route search demand has not been transmitted (YES at S205), the demand transferring unit 15c updates information in the route search demand and transmits the route search demand to adjacent node to which the route search demand has not been transmitted (S206). On the other hand, when the determining unit 15b determines that there is no adjacent node to which the route search demand has not been transmitted (NO at S205), the request response unit 15d updates information in the route search demand and transfers the route search demand to an adjacent node serving as a transfer destination (S207).

Advantageous Effects of the First Embodiment

According to the first embodiment, the node 10 autonomously executes a route search demand by focusing on the redundant routes as the SLA important for a user, and when detecting routes that satisfy the SLA, stops the route search. Therefore, it becomes possible to confirm a network configuration with a minimum traffic that satisfies the SLA. In addition, when the SLA is not satisfied, a warning is transmitted. Therefore, the user can easily check a node that does not satisfy the SLA.

Furthermore, according to the first embodiment, it becomes possible to search for redundant routes even when a topology is not known. When the redundant routes are not ensured, a warning is transmitted to notify a failure, such as a problem with a current topology, a failure in normal operation of the network, a problem with a node, or a problem with a route.

[b] Second Embodiment

The node disclosed herein can perform a route search at various timings. Therefore, in a second embodiment, an example will be explained in which a node that has detected a link disconnection performs a route search.

Overall Configuration

Figures 11, 12:
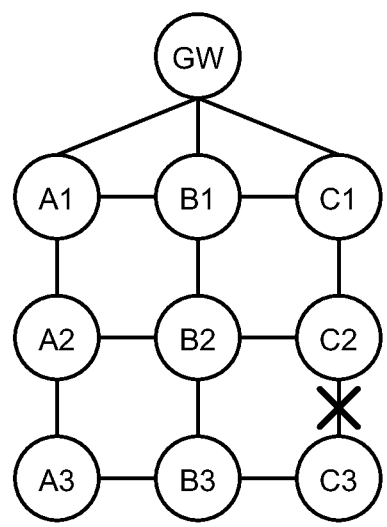
FIG. 11 is a diagram illustrating an overall configuration of a system according to a second embodiment.
FIG. 12 is a diagram illustrating an example of a frame format of a route search request.

FIG. 11 is a diagram illustrating an overall configuration of a system according to the second embodiment. As illustrated in FIG. 11, the system includes a GW device, nodes A1 to A3, nodes B1 to B3, and nodes C1 to C3. The SLA is set such that the number of redundant routes=2.

The GW device is adjacent to the node A1, the node B1, and the node C1. In other words, the GW device can directly communicate with these nodes. The node A1 is adjacent to the GW device, the node B1, and the node A2. The node A2 is adjacent to the node A1, the node B2, and the node A3. The node A3 is adjacent to the node A2 and the node B3.

The node B1 is adjacent to the GW device, the node A1, the node B2, and the node C1. The node B2 is adjacent to the node A2, the node B1, the node B3, and the node C2. The node B3 is adjacent to the node A3, the node B2, and the node C3.

The node C1 is adjacent to the GW device, the node B1, and the node C2. The node C2 is adjacent to the node B2, the node C1, and the node C3. The node C3 is adjacent to the node B3 and the node C2.

In this state, if a link between the node C3 and the node C2 is disconnected, the node C3 and the node C2 detect the link disconnection by polling or by determining whether a Hello packet is received. Accordingly, each of the node C3 and the node C2 performs a route search.

In this system, because the node C3 has the node B3 and the node C2 as adjacent nodes confirmed as the redundant routes, the node C3 can ensure only one redundant route. Therefore, the node C3 transmits a warning to the GW device.

On the other hand, because the node C2 has the node B2, the node C1, and the node C3 as adjacent nodes confirmed as the redundant routes, the node C2 can ensure two redundant routes and determines that the SLA is satisfied. The node C2 transmits a route search request to, for example, the node C1 among the ensured adjacent nodes. The route search request is a frame which triggers the redundant route search. The node that receives the route search request executes the redundant route search.

The route search request will be explained below. FIG. 12 is a diagram illustrating an example of a frame format of the route search request. As illustrated in FIG. 12, the route search request contains "a content of the cause, information on a causal node, a GS, a LS, and a frame ID".

The "content of the cause" stored herein is a reason why the route search request is transmitted. For example, the search executing unit 14 or the like stores "detection of a link disconnection" or the like. The "information on a causal node" is information on a node that causes transmission of the route search request. In this example, the search executing unit 14 or the like of the node C2 stores the "MAC address of the node C3" or the like. The "GS", the "LS", and the "frame ID" are the same as those described above, and therefore, explanation thereof will be omitted.

In this example, for example, the search executing unit 14 or the like of the node C2 generates a route search request containing "detection of a link disconnection, the MAC address of the node C3, the MAC address of the node C2, the MAC address of the node C2, F11" or the like.

Processing Flow

A process performed when the route search demand is transmitted due to a link disconnection and a process performed when the route search request is received will be explained below.

Figure 13:
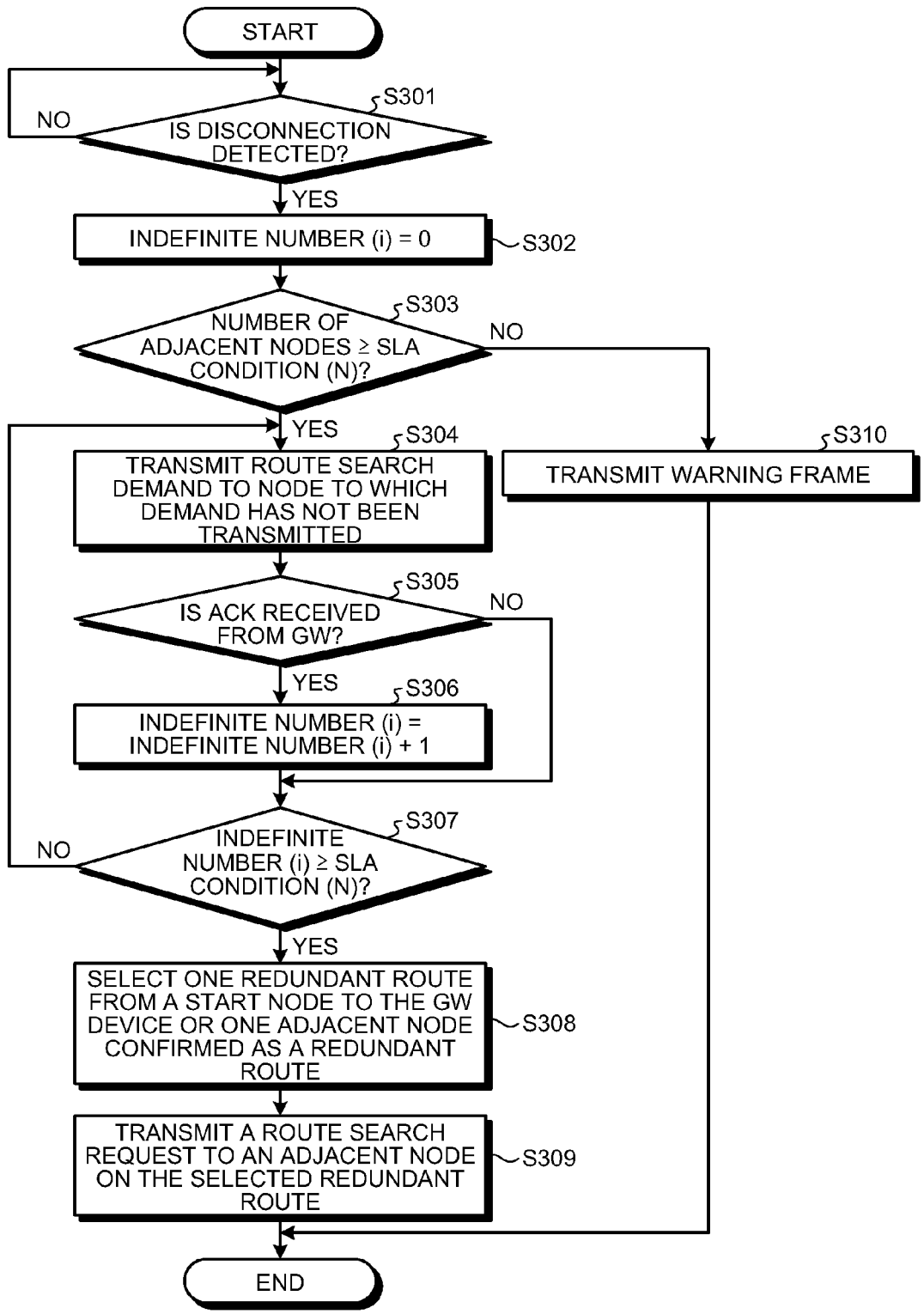
FIG. 13 is a flowchart illustrating the flow of a process when a node according to the second embodiment performs a search according to a route search demand and executes a route search request.

Process Performed When the Route Search Demand is Transmitted Due to a Link Disconnection FIG. 13 is a flowchart illustrating the flow of a process when the node according to the second embodiment performs a search by a route search demand and executes a route search request. As illustrated in FIG. 13, when detecting a line disconnection (YES at S301), the transmitting unit 14a sets an indefinite number (i) to "0" (S302).

Subsequently, the transmitting unit 14a refers to the routing table 12c or the link table 12b to determine whether the number of adjacent nodes satisfies the SLA condition, that is, whether the number of adjacent nodes is equal to or greater than the number (N) defined in the SLA (S303).

When the number of adjacent nodes is equal to or greater than the number defined in the SLA (YES at S303), the transmitting unit 14a generates a route search demand and transmits the route search demand to a node to which the route search demand has not been transmitted (S304). Subsequently, when receiving an ACK from the GW device (YES at S305), the counting unit 14c increments the indefinite number (i) (S306). When an ACK is not received from the GW device and timeout or the like occurs (NO at S305), the process at S307 is performed without performing the process at S306.

The transmission control unit 14d determines whether the indefinite number (i) satisfies the SLA condition, that is, whether the number of received ACKs is equal to or greater than the number (N) defined in the SLA (S307). When the indefinite number (i) satisfies the SLA condition (N) (YES at S307), the transmission control unit 14d selects one redundant route from a start node to the GW device or one adjacent node confirmed as a redundant route (S308), transmits a route search request to an adjacent node on the selected redundant route, and terminates the process (S309). On the other hand, when the transmission control unit 14d determines that the indefinite number (i) does not satisfy the SLA condition (NO at S307), the process is repeated from S304.

At S303, when the number of adjacent nodes is smaller than the number defined in the SLA (NO at S303), the warning transmitting unit 14e generates a warning frame and transmits the warning frame to the GW device (S310).

Process Performed When the Route Search Request is Received

Figure 14:
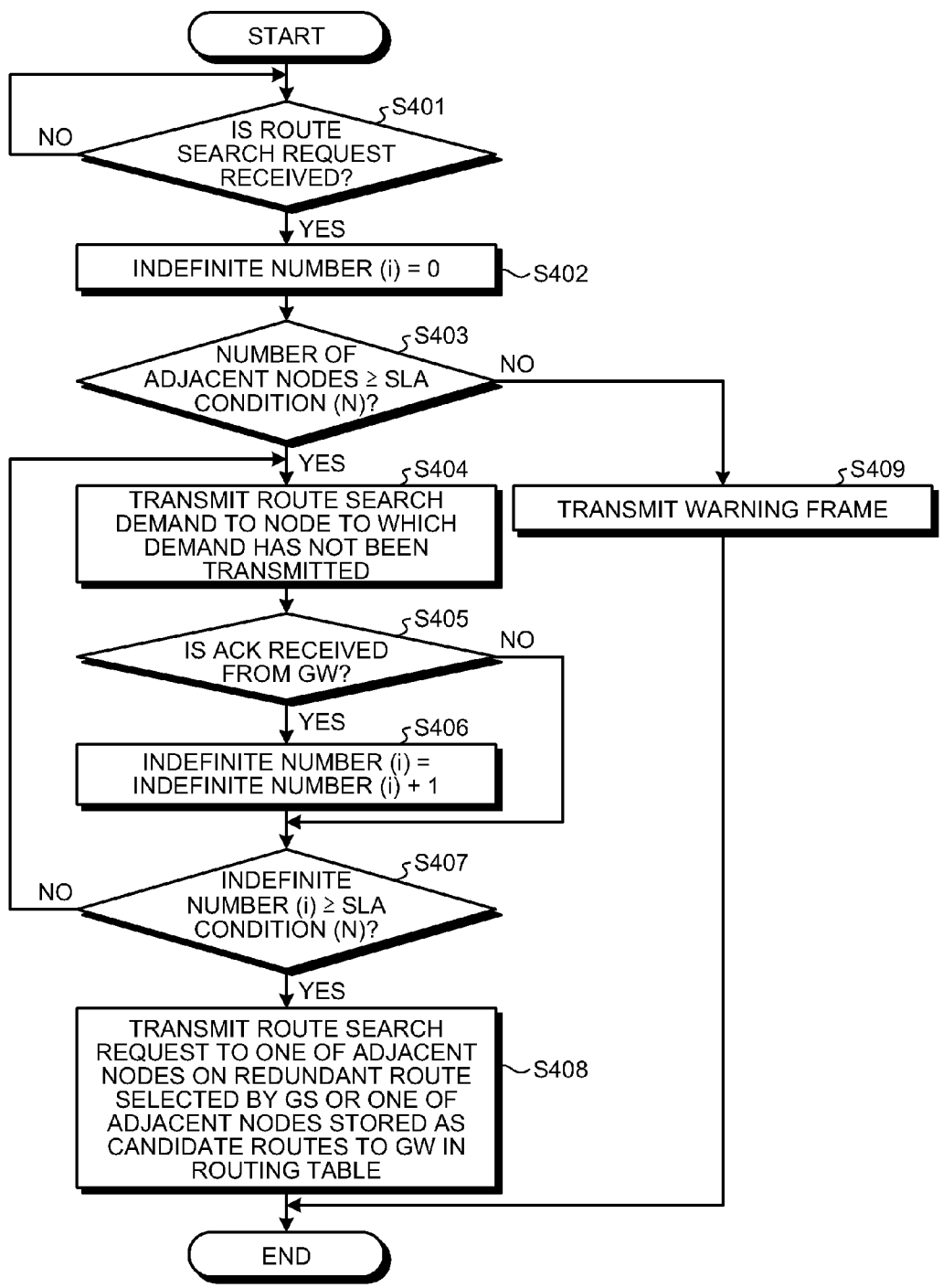
FIG. 14 is a flowchart illustrating the flow of a process when the node according to the second embodiment receives the route search request.

FIG. 14 is a flowchart illustrating the flow of a process when the node according to the second embodiment receives a route search request. As illustrated in FIG. 14, when the node according to the second embodiment receives a route search request (YES at S401), the node performs the process from S402 to S407 and S409 that are the same as the process at S102 to S107 and S108 explained in the first embodiment, respectively; therefore, the detailed explanation of the process will be omitted.

A difference from the first embodiment lies in that, when the indefinite number (i) satisfies the SLA condition (N) at S407 (YES at S407), the node according to the second embodiment transmits the route search request to one of adjacent nodes on the redundant routes selected by the GS or to one of adjacent nodes stored as candidate routes to the GW in the routing table, and terminates the process (S408).

Advantageous Effects of the Second Embodiment

The node according to the second embodiment performs a redundant route search by the node when detecting a link disconnection, and transmits a warning to the GW device when the SLA is not satisfied. Incidentally, when detecting the link disconnection, the node transmits a request to search for redundant routes to adjacent nodes of the subject node. Therefore, only the minimum node related to the link disconnection performs a redundant route search, so that it becomes possible to confirm a network configuration with a small traffic.

[c] Third Embodiment

In the first embodiment, an example has been explained in which a warning frame is transmitted when the number of adjacent nodes is smaller than the SLA condition (N); however, the present invention is not limited to this example. For example, it may be possible to transmit a warning frame when a sum of the number of adjacent nodes (i) that have already been detected as the redundant routes and the number of adjacent nodes that have not been confirmed is smaller than the SLA condition (N).

Figure 15:
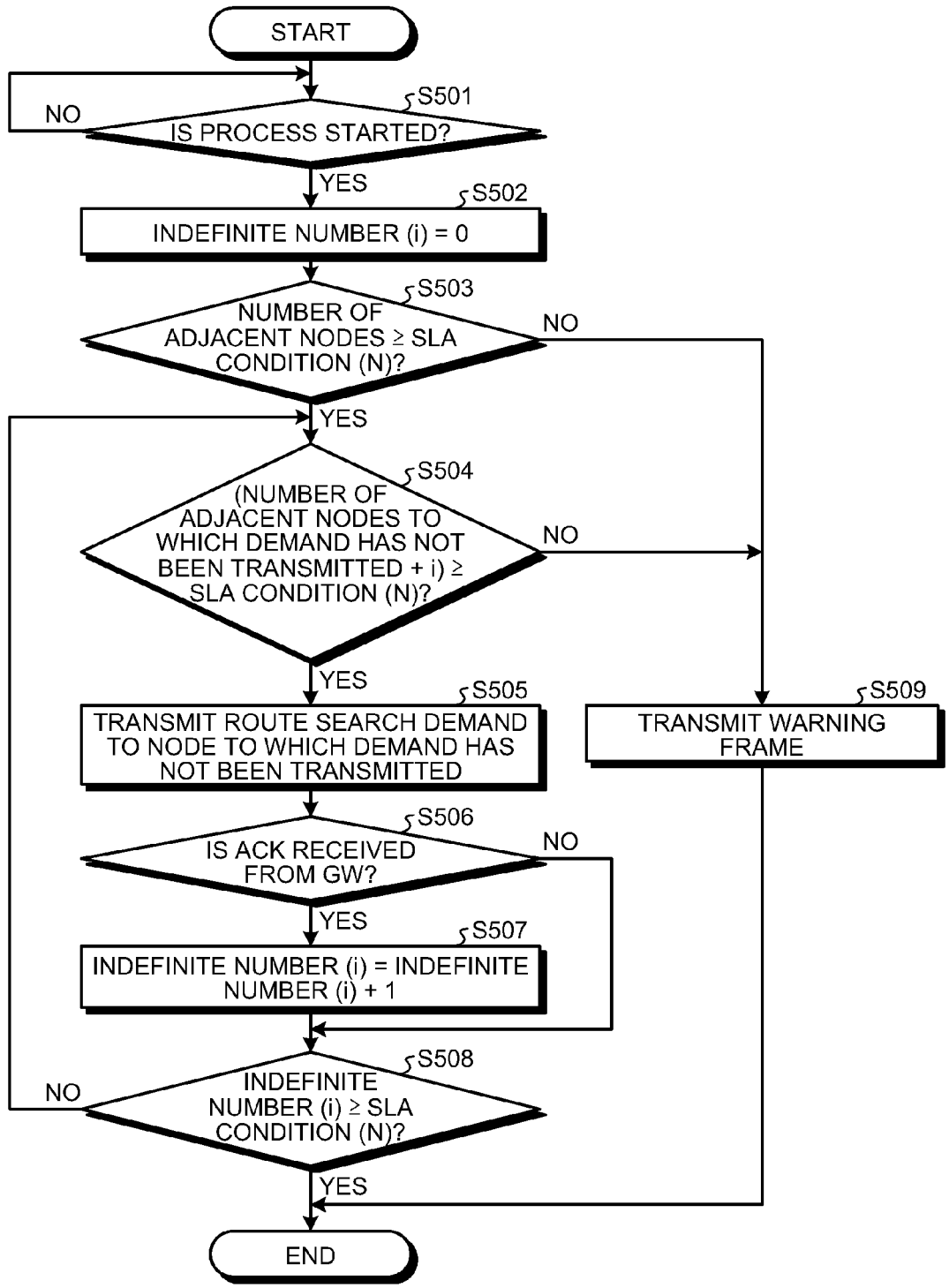
FIG. 15 is a flowchart illustrating the flow of a process when a node according to a third embodiment transmits a route search demand.

Therefore, in a third embodiment, an example will be explained in which a warning frame is transmitted when a sum of the number of adjacent nodes (i) that have already been detected as the redundant routes and the number of adjacent nodes that have not been confirmed is smaller than the SLA condition (N). FIG. 15 is a flowchart illustrating the flow of a process when a node according to the third embodiment transmits a route search demand.

As illustrated in FIG. 15, when the transmitting unit 14a is instructed to start a process (YES at S501), the transmitting unit 14a sets an indefinite number (i) to "0" (S502). Subsequently, the transmitting unit 14a refers to the routing table 12c or the link table 12b to determine whether the number of adjacent nodes is equal to or greater than the number (N) defined in the SLA (S503).

When the number of adjacent nodes is equal to or greater than the number defined in the SLA (YES at S503), the transmitting unit 14a compares a sum of the number of nodes to which the route search demand has not been transmitted and the number of detected routes (the indefinite number (i)) with the SLA (S504). In other words, the transmitting unit 14a determines whether a sum of the number of adjacent nodes (i) that have already been detected as the redundant routes and the number of adjacent nodes that have not been confirmed is equal to or greater than the SLA condition (N).

Subsequently, when the sum of the number of the nodes to which the route search demand has not been transmitted and the number of the detected routes (the indefinite number (i)) is smaller than the SLA (NO at S504), the transmitting unit 14a transmits a warning frame because the SLA is not satisfied (S509).

On the other hand, when the sum of the number of the nodes to which the route search demand has not been transmitted and the number of the detected routes (the indefinite number (i)) is equal to or greater than the SLA (YES at S504), the transmitting unit 14a generates a route search demand and transmits the route search demand to the node to which the route search demand has not been transmitted (S505).

Subsequently, when receiving an ACK from the GW device 5 (YES at S506), the counting unit 14c increments the indefinite number (i) (S507). When an ACK is not received from the GW device 5 and timeout or the like occurs (NO at S506), the process at S508 is performed without performing the process at S507.

The transmission control unit 14d determines whether the indefinite number (i) satisfies the SLA condition, that is, whether the number of received ACKs is equal to or greater than the number (N) defined in the SLA (S508). When the transmission control unit 14d determines that the indefinite number (i) satisfies the SLA condition (N) (YES at S508), the process is terminated. On the other hand, when the transmission control unit 14d determines that the indefinite number (i) does not satisfy the SLA condition (NO at S508), the process is returned to S504 and the process is repeated.

Therefore, the node 10 can transmit a warning to the management server 7 as soon as it is confirmed that the number of the adjacent nodes serving as the confirmed routes is smaller than the SLA condition. Therefore, it becomes possible to promptly notify the management server 7 of a warning. Furthermore, it becomes possible to reduce useless confirmation packets, enabling to reduce a traffic volume.

The method described above may be applied to the second embodiment. Specifically, it is possible to add the same step as the process at S504 described in FIG. 15 between the process at S303 and the process at S304 illustrated in FIG. 13. Specifically, when a sum of the number of nodes to which the route search demand has not been transmitted and the number of detected routes (the indefinite number (i)) is smaller than the SLA, the node 10 transmits a warning frame because the SLA is not satisfied. On the other hand, when the sum of the number of nodes to which the route search demand has not been transmitted and the number of detected routes (the indefinite number (i)) is equal to or greater than the SLA, the transmitting unit 14a may perform the process at S304.

Similarly, it may be possible to add the same process as the process at S504 explained in FIG. 15 between the process at S403 and the process at S404 illustrated in FIG. 14. Specifically, when a sum of the number of nodes to which the route search demand has not been transmitted and the number of detected routes (the indefinite number (i)) is smaller than the SLA, the node 10 transmits as warning frame because the SLA is not satisfied. On the other hand, when the sum of the number of nodes to which the route search demand has not been transmitted and the number of detected routes (the indefinite number (i)) is equal to or greater than the SLA, the transmitting unit 14a may perform the process at S404.

As described above, even when the method is applied to the second embodiment, similarly to the third embodiment, the node 10 can transmit a warning to the management server 7 as soon as it is confirmed that the number of adjacent nodes that are confirmed nodes is smaller than the SLA condition.

[d] Fourth Embodiment

While the embodiments of the present invention have been explained above, the present invention may be embodied in various forms other than the embodiments described above. Therefore, the other embodiments will be explained below.

Trigger for executing a route search

For example, the trigger for causing the node to perform a route search may be set arbitrarily other than those described in the first embodiment and the second embodiments. For example, it may be possible to perform a route search according to various triggers, such as at timing newly added to the system, at a timing at which the system is recovered from a failure, or at regular intervals after transmission of a warning.

Furthermore, it may be possible to provide a button on the node such that when a user presses the button, the route search is performed and redundant routes as a result of the search are displayed on a display or the like.

With this configuration, a provider of nodes can install the nodes at locations so that the number of the redundant routes can satisfy the SLA.

SLA

For example, in the embodiments described above, an example has been explained that the number of redundant routes to the GW device is two as the SLA; however, the present invention is not limited to this example. The setting may be changed arbitrarily. Furthermore, it may be possible to allow a user to arbitrarily set redundant routes to an arbitrary node or to an external sever, instead of the redundant routes to the GW device.

System

Of the processes described in the embodiments, all or part of a process described as being performed automatically can also be performed manually. Alternatively, all or part of a process described as being performed manually can also be performed automatically by known methods. In addition, the processing procedures, control procedures, specific names, and information including various types of data and parameters illustrated in the above-described document and drawings can be arbitrarily changed unless otherwise specified.

The components of each device illustrated are functionally conceptual, and the components are not always physically configured as illustrated in the drawings. In other words, specific forms of distribution and integration of the apparatuses are not limited to those illustrated in the drawings, and all or part of the apparatuses can be functionally or physically distributed or integrated in arbitrary units according to various loads and the state of use. Further, for each processing function performed by each apparatus, all or any part of the processing function can be implemented by a CPU, can be implemented by a program analyzed and executed by the CPU, or can be implemented as hardware by wired logic Program Meanwhile, the various processes described in the above embodiments are implemented by causing a computer system, such as a personal computer or a workstation, to execute a program prepared in advance. Therefore, in the following, an example of the computer system that executes a program having the same functions as those explained in the above embodiments will be explained.

Figure 16:
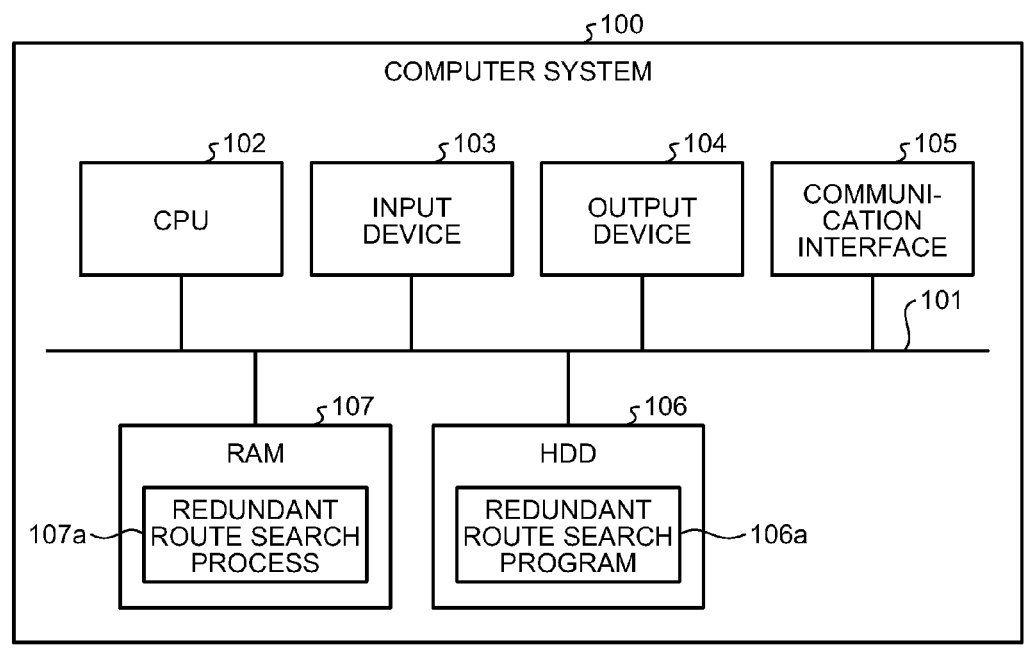
FIG. 16 is a diagram illustrating a hardware configuration example of a computer that executes a redundant route search program.

FIG. 16 is a diagram illustrating a hardware configuration example of a computer that executes a redundant route search program. As illustrated in FIG. 16, a computer system 100 includes a CPU 102, an input device 103, an output device 104, a communication interface 105, a hard disk drive (HDD) 106, and a random access memory (RAM) 107, all of which are connected to a bus 101.

The input device 103 is a mouse or a keyboard. The output device 104 is a display. The communication interface 105 is an interface, such as a network interface card (NIC). The HDD 106 stores therein a redundant route search program 106a and information stored in the tables illustrated in FIG. 6 and the like. While the HDD 106 is described as an example of a recording medium, it may be possible to store various programs in a computer-readable recording medium, such as a read only memory (ROM), a RAM, or a compact-disc ROM (CD-ROM) and cause the computer to read the programs. It may be possible to locate the recording medium at a remote place, and to cause the computer to access the recording medium to acquire and use the programs. In this case, the computer may store the acquired programs in a recording medium of the computer.

The CPU 102 reads the redundant route search program 106a and loads it onto the RAM 107 to run a redundant route search process 107a for implementing the functions explained in FIG. 2 and the like. Specifically, the redundant route search process 107a executes the same functions as those of the search executing unit 14 or the search response unit 15 illustrated in FIG. 2. In this way, the computer system 100 functions as an information processing apparatus that reads and executes the programs to implement a redundant route search method.

According to the embodiment of the communication device and the route search method disclosed herein, there is an advantageous effect to enable to confirm a network configuration with a smaller traffic.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device comprising:
a memory; and
a processor connected to the memory, wherein the processor executes a process including:
first transmitting a route search demand, the route search demand being a demand to search for a route from the communication device to a predetermined device among adjacent communication devices that communicate directly with the communication device, to an adjacent communication device that is not selected as a transmission destination of the route search demand;
receiving a response to the route search demand transmitted at the first transmitting from the predetermined device;
second transmitting the route search demand when the response is received, and when the number of adjacent communication devices serving as confirmed routes is smaller than a predetermined number and when there is an adjacent communication device that has not been selected;
stopping transmission of the route search demand when the response is received and when the number of the adjacent communication devices serving as the confirmed routes reaches the predetermined number; and
third transmitting a warning to the predetermined device when the number of the adjacent communication devices serving as the confirmed routes is smaller than the predetermined number and when there is no communication device that has not been selected.

2. The communication device according to claim 1, wherein the process further includes searching for a route when receiving the route search demand from any of the adjacent communication devices, under a condition that adjacent communication devices other than adjacent communication devices selected by a communication device serving as a transmission source of the route search demand are not selected.

3. The communication device according to claim 1, wherein
when detecting a link disconnection with an adjacent communication device, the first transmitting includes transmitting the route search demand to the adjacent communication device that has not been selected, and
the stopping includes stopping transmission of the route search demand when the number of adjacent communication devices to which the route search demand has been transmitted reaches the predetermined number, and transmitting a route search request to search for a route, to one of adjacent communication devices other than the adjacent communication device with which the link disconnection has been detected.

4. The communication device according to claim 1, wherein
when receiving a route search request to search for a route from an adjacent communication device, the first transmitting includes transmitting the route search demand to an adjacent communication device that has not been selected,
the receiving includes receiving a response to the route search demand transmitted at the first transmitting from the predetermined device,
the second transmitting includes transmitting the route search demand when the number of adjacent communication devices serving as the confirmed routes is smaller than the predetermined number and when there is an adjacent communication device that has not been transmitted,
the stopping includes stopping transmission of the route search demand when the number of the adjacent communication devices serving as the confirmed routes reaches the predetermined number, and transmitting the route search request to an adjacent communication device other than the adjacent communication device with which a link disconnection has been detected among the adjacent communication devices or to an adjacent communication device other than the adjacent communication device serving as a transmission source of the route search request, and
the third transmitting includes transmiting the warning to the predetermined apparatus and terminates the route search request when the number of the adjacent communication devices serving as the confirmed routes is smaller than the predetermined number and when there is no adjacent communication device that has not been selected.

5. A route search method implemented by a computer, the route search method comprising:
transmitting a route search demand, the route search demand being a demand to search for a route from the computer to a predetermined device among adjacent communication devices that communicate directly with the computer, to an adjacent communication device that is not selected as a transmission destination of the route search demand;
receiving a response to the route search demand transmitted at the transmitting from the predetermined device;
transmitting the route search demand when the response is received and when the number of adjacent communication devices serving as confirmed routes is smaller than a predetermined number and when there is an adjacent communication device that has not been selected;
stopping transmission of the route search demand when the response is received and when the number of the adjacent communication devices serving as the confirmed routes reaches the predetermined number; and transmitting a warning to the predetermined device when the number of the adjacent communication devices serving as the confirmed routes is smaller than the predetermined number and when there is no communication device that has not been selected.

6. A non-transitory computer-readable recording medium storing therein a route search program that causes a computer to execute a process comprising:

transmitting a route search demand, the route search demand being a demand to search for a route from the computer to a predetermined device among adjacent communication devices that communicate directly with the computer, to an adjacent communication device that is not selected as a transmission destination of the route search demand;

receiving a response to the route search demand transmitted at the transmitting from the predetermined device;

transmitting the route search demand when the response is received and when the number of adjacent communication devices serving as confirmed routes is smaller than a predetermined number and when there is an adjacent communication device that has not been selected;

stopping transmission of the route search demand when the response is received and when the number of the adjacent communication devices serving as the confirmed routes reaches the predetermined number; and transmitting a warning to the predetermined device when the number of the adjacent communication devices serving as the confirmed routes is smaller than the predetermined number and when there is no communication device that has not been selected.

* * * * *